US011089268B2

(12) United States Patent
Golan et al.

(10) Patent No.: US 11,089,268 B2
(45) Date of Patent: Aug. 10, 2021

(54) SYSTEMS AND METHODS FOR MANAGING AND DISPLAYING VIDEO SOURCES

(71) Applicant: Verint Systems Ltd., Herzilya Pituach (IL)

(72) Inventors: Oren Golan, Herzilya Pituach (IL); Boaz Dudovich, Herzilya Pituach (IL); Shahar Daliyot, Herzilya Pituach (IL); Ron Schwartz, Herzilya Pituach (IL)

(73) Assignee: Verint Systems Ltd., Herzilya Pituach (IL)

( * ) Notice: Subject to any disclaimer, the term of this patent is extended or adjusted under 35 U.S.C. 154(b) by 0 days.

(21) Appl. No.: 16/780,188

(22) Filed: Feb. 3, 2020

(65) Prior Publication Data

US 2020/0177843 A1 Jun. 4, 2020

Related U.S. Application Data

(63) Continuation of application No. 16/111,377, filed on Aug. 24, 2018, now Pat. No. 10,554,934, which is a continuation of application No. 13/005,996, filed on Jan. 13, 2011, now Pat. No. 10,084,993.

(60) Provisional application No. 61/295,095, filed on Jan. 14, 2010.

(51) Int. Cl.
*H04N 7/18* (2006.01)
(52) U.S. Cl.
CPC .................................. *H04N 7/181* (2013.01)
(58) Field of Classification Search
None
See application file for complete search history.

(56) References Cited

U.S. PATENT DOCUMENTS

| | | | |
|---|---|---|---|
| 4,992,866 A | 2/1991 | Morgan | |
| 6,741,276 B1 | 5/2004 | Yonezawa | |
| 7,116,357 B1 | 10/2006 | Oya | |
| 7,131,136 B2 | 10/2006 | Monroe | |
| 7,777,783 B1 | 8/2010 | Chin et al. | |
| 2005/0206513 A1* | 9/2005 | Fallon | G08B 25/012 340/506 |
| 2006/0176369 A1 | 8/2006 | Meritt | |
| 2007/0250264 A1 | 10/2007 | Sekine et al. | |
| 2008/0084473 A1 | 4/2008 | Romanowich | |
| 2008/0211929 A1 | 9/2008 | Uchihara | |
| 2008/0291205 A1 | 11/2008 | Rasmussen et al. | |
| 2009/0216775 A1 | 8/2009 | Ratliff et al. | |
| 2009/0237510 A1 | 9/2009 | Chen et al. | |
| 2009/0262206 A1 | 10/2009 | Park | |

* cited by examiner

Primary Examiner — James M Anderson, II
(74) Attorney, Agent, or Firm — ISUS Intellectual Property PLL; Anthony Jason Mirabito

(57) ABSTRACT

A video system for video surveillance or video monitoring includes a video source, a video control system, and a video management system. The video management system is configured to receive configuration data and generate maps based on the configuration data, wherein at least one of the maps is associated with the video source. The video management system displays the map associated with the video source and displays a graphical symbol on the map which indicates the location of the video source. The video management system then receives a selection of the video source, receives information associated with the selected video source, and displays the received information.

20 Claims, 6 Drawing Sheets

SYSTEMS AND METHODS FOR MANAGING AND DISPLAYING VIDEO SOURCES

RELATED APPLICATIONS

This application is a continuation of U.S. patent application Ser. No. 16/111,377, filed on Aug. 24, 2018, which application is a continuation of U.S. patent application Ser. No. 13/005,996, filed on Jan. 13, 2011, which Application claims priority to United States Provisional Patent Application No. 61/295,095, entitled "Systems and Methods for Managing and Displaying Video Sources" filed on Jan. 14, 2010, which are hereby incorporated by reference in their entireties.

TECHNICAL FIELD

Aspects of the invention are related, in general, to the field of video surveillance and monitoring.

TECHNICAL BACKGROUND

Many common video systems include video cameras and video processing systems. Video control systems receive and process streams of video or images which are captured by video cameras. Many of these video systems process and store video in digital form. The video processing system may perform many different processes on the video including: storing, transferring, compressing, thinning, or various types of video analytics processes. The video system may also control the video cameras by sending pan, tilt, zoom, or other instructions to the video cameras.

Video systems are often used for surveillance, security, or other types of monitoring uses. In these applications, many video cameras may be used and these cameras may even be spread among multiple physical locations. A user in a single location may wish to view video from various locations by selecting from among the multiple video cameras. The user may wish to make the video camera selection based on information about where the camera is located or the scene the camera is covering. In some cases, a user may wish to view video from cameras in a particular sequence in order to follow the movement of a person or an object through an area.

Overview

A video system for video surveillance or video monitoring includes a video source, a video control system, and a video management system. The video management system is configured to receive configuration data and generate maps based on the configuration data, wherein at least one of the maps is associated with the video source. The video management system displays the map associated with the video source and displays a graphical symbol on the map which indicates the location of the video source. The video management system then receives a selection of the video source, receives information associated with the selected video source, and displays the received information.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
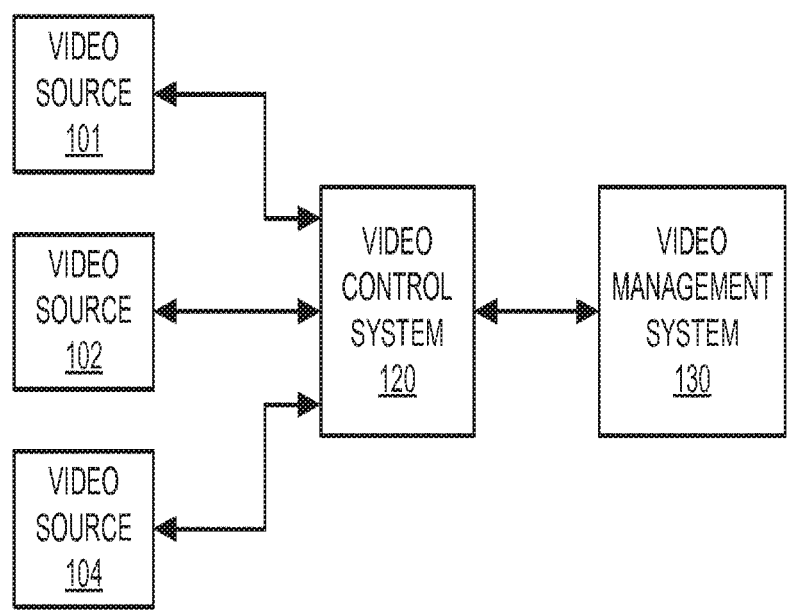
FIG. 1 illustrates a video system.

FIG. 1 illustrates video system 100 for video surveillance or monitoring. Video system 100 includes video sources 101-104, video control system (VCS) 120, and video management system (VMS) 130. VCS 120 receives video from video sources 101-104. VMS 130 displays one or more maps, displays the location of one or more of video sources 101-104 on the maps, and displays information associated with one or more of video sources 101-104.

Figure 2:
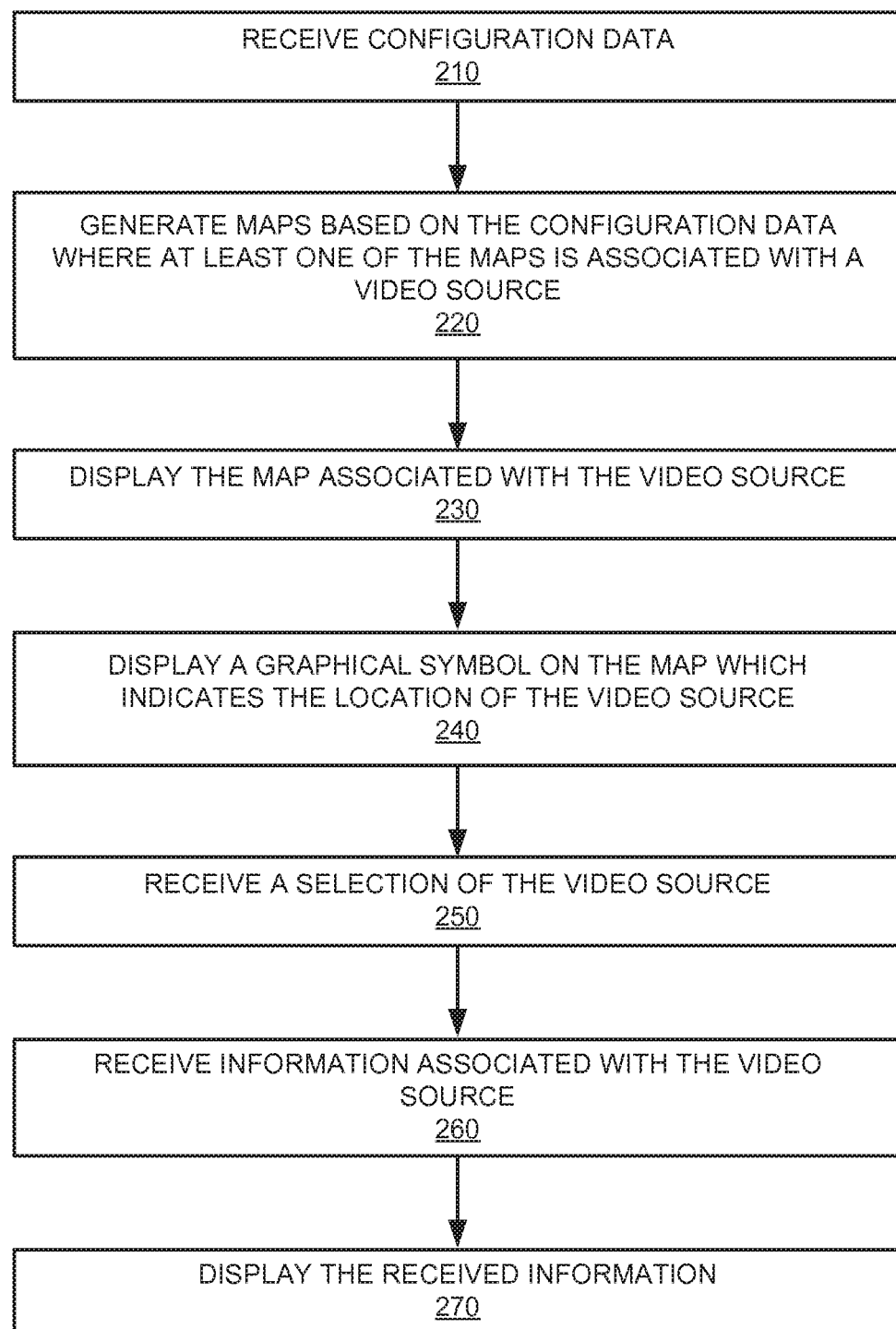
FIG. 2 illustrates an operation of a video system.

FIG. 2 illustrates an operation of video system 100. The steps of operation are indicated below parenthetically. VMS 130 is configured to receive configuration data (210) and generate maps based on the configuration data, wherein at least one of the maps is associated with at least one of video sources 101-104 (220). VMS 130 displays the map associated with the video source (230) and then displays a graphical symbol on the map which indicates the location of the video source (240). VMS 130 receives a selection of the video source (250). Information associated with the video source is received by VMS 130 (260). Finally, VMS 130 displays the received information (270).

In another example, the information received by VMS 130 comprises video associated with the video source. VMS 130 displays the video associated with the selected video source. In a further variation of this example, multiple video sources are selected and video associated each of the video sources is displayed simultaneously.

The operation of video system 100, as illustrated in FIG. 2, enables a user to see the physical location of video sources 101-104 on maps. The user may select video sources based on the physical location or proximity of the video sources to the areas of interest or based on other factors. Once selected, the user is able to view information or video associated with the selected video source.

Referring back to FIG. 1, video sources 101-104 may comprise any device having the capability to capture video or images. Video sources 101-104 comprise circuitry and an interface for transmitting video or images. Video sources 101-104 may be the devices which perform the initial optical capture of the video or may be intermediate transfer devices. For example, video sources 101-104 may be video cameras, still cameras, internet protocol (IP) cameras, video switches, video buffers, video servers, or other video transmission devices, including combinations thereof.

VCS 120 may comprise any device for processing or distributing video, video streams, or images. VCS 120 comprises processing circuitry and an interface for receiving video or other information. VCS 120 may perform various buffering, multiplexing, or distribution functions in order to make video from video sources 101-104 available to other systems or users. VCS 120 may also perform other control functions including instructing the video sources to pan, tilt, zoom, power cycle, perform diagnostics, or other instructions. VCS 120 may also control many additional video sources which may be spread across multiple physical sites or locations. VCS 120 may have a separate interface for transmitting video and other information or may do so through the same interface through which video and other information is received. VCS 120 may also comprise memory, software, firmware, communication components, a power supply, structural support, or other components. VCS 120 may be a video switching system, server, computing system, application specific circuitry, custom hardware, or some type of processing device, including combinations thereof.

VCS 120 is connected to video sources 101-104 via links which may use any of a variety of communication media, such as air, metal, optical fiber, or any other type of signal propagation path, including combinations thereof. The links may use any of a variety of communication protocols, such as internet, telephony, optical networking, wireless communication, wireless fidelity, or any other communication protocols and formats, including combinations thereof.

VMS 130 may comprise any device for receiving and displaying information or video associated with video sources 101-104. VMS 130 may also be configured to perform further processing or manipulation on video, video streams, or images. VMS 130 comprises a display, processing circuitry, and an interface for receiving video or other information. VMS 130 displays maps and the location of video sources 101-104 on those maps. VMS 130 allows a user to select a video source and see information about or video from the selected video source. VMS 130 may also enable the user to perform control functions on the video sources including instructions to pan, tilt, zoom, power cycle, perform diagnostics, or other instructions. VMS 130 may also comprise memory, software, firmware, communication components, power supply, structural support, or other components. VMS 130 may be a video processing system, video analytics system, server, computing system, application specific circuitry, custom hardware, or some type of processing device, including combinations thereof.

VMS 130 is connected to VCS 120 via one or more links which may use any of a variety of communication media, such as air, metal, optical fiber, or any other type of signal propagation path, including combinations thereof. The link may use any of a variety of communication protocols, such as internet, telephony, optical networking, wireless communication, wireless fidelity, or any other communication protocols and formats, including combinations thereof.

Although VCS 120 and VMS 130 are illustrated as separate devices, one skilled in the art will appreciate that the functions associated with VCS 120 and VMS 130 may be combined in a single device or distributed across VCS 120, VMS 130, or other devices, in a variety of manners.

Figure 3:
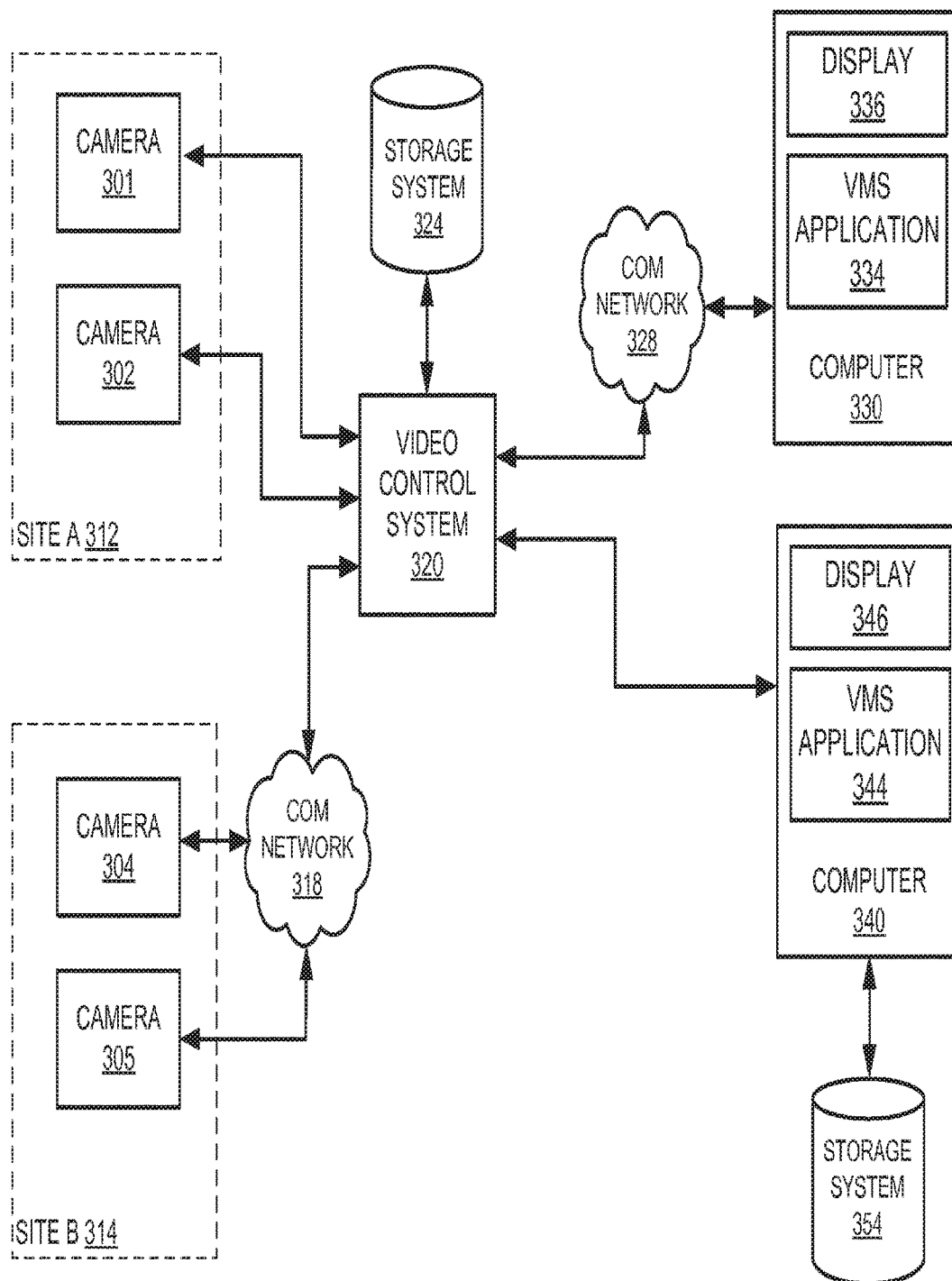
FIG. 3 illustrates a video system in which a video management system application may be used to view video from two sites.

FIG. 3 illustrates video system 300 in which a VMS application may be used to view video from one or more video sources. Video system 300 is an example of video system 100 although video system 300 may have an alternate configuration or operate in an alternate manner. Video system 300 includes cameras 301 and 302 at site A 312 and cameras 304 and 305 at site B 314. Video system 300 also includes VCS 320, computer 330, computer 340, storage system 324, and storage system 354, communication network 318, and communication network 328. Video system 300 enables a user of computer 330 or computer 340 to view the location of the cameras on maps which depict the orientation and surroundings of the cameras as well as the spatial relationships between the cameras. The user may view information about or video from one or more of the cameras.

Video system 300 comprises cameras at multiple sites. Cameras 301 and 302 are located at site A 312. Cameras 304 and 305 are located at site B 314. Site A 312 and site B 314 may be in different countries, in different states, in different parts of the same city, in different buildings, or in different areas of the same building. Each of site A 312 and site B 314 may typically include many additional cameras. In one example, site A 312 and site B 314 are two different retail stores operated by the same entity and each of the cameras within each store cover different departments. A typical installation will have more than two cameras but only two are shown at each site in FIG. 3 for the sake of clarity. Video system 300 may also typically include additional sites with additional cameras.

VCS 320 is an example of VCS 120 although VCS 320 may have an alternate configuration or operate in an alternate manner. As illustrated, VCS 320 may communicate with the cameras through direct links or through a network, like communication network 318. Communication network 318 may be an Internet, intranet, dedicated network, wireless network, local area network, or other type of network, including combinations thereof.

Storage systems 324 and 354 are used for storage of video from the cameras as well as for storage of other information. Storage systems 324 and 354 comprise a communication interface and components for storing information or video. The storage components of storage systems 324 and 354 may comprise a disk drive, optical disk, flash memory, solid state memory, tape drive, or other device for storage of digital data, including combinations thereof. Storage systems 324 and 354 may also comprise additional interfaces for transmitting or receiving data, software, firmware, power supply, structural support, or other components. Storage systems 324 and 354 may be servers, disk arrays, databases, or other devices which provide storage of digital data. When computer 330 requests video associated with a particular camera, VCS 320 may provide video retrieved from storage system 324 or may provide a live video stream from the camera.

Computer 330 and computer 340 are any of a variety of computers or processing systems which are capable of executing software applications. Computer 330 comprises display 336 and VMS application 334. Computer 340 comprises display 346 and VMS application 344. By executing the VMS applications, computers 330 and 340 display maps and the location of the cameras on those maps. The VMS applications enable a user to select a camera and see information or video associated with the selected camera. Computers 330 and 340 may also comprise memory, other software, firmware, communication components, power supply, structural support, or other components. Computers 330 and 340 may be video processing systems, video analytics systems, servers, computing systems, application specific circuitry, custom hardware, or other types of processing devices, including combinations thereof.

As illustrated in FIG. 3, computer 340 communicates with VCS 320 over a direct link while computer 330 communicates with VCS 320 through communication network 328. Communication network 328 may be an Internet, intranet, dedicated network, wireless network, local area network, or other type of network, including combinations thereof.

In one example of operation of video system 300, VMS application 344 is executed on computer 340 in order to assist a user in monitoring activities in retail stores at site A 312 and site B 314. Using an interface on computer 340, VMS application 344 communicates with VCS 320. VMS application 344 requests and receives configuration data relating to cameras 301-305. The configuration data may include information about the cameras, information about the location of the cameras, and information about the sites in which those cameras are installed. The configuration information may be available from VCS 320, storage system 324, storage system 354, or a combination thereof.

Next, VMS application 344 generates maps based on the configuration data. The maps include the location of the cameras, layouts of the stores, the areas or departments covered by the cameras, or combinations thereof. Graphical symbols are used to indicate the locations of the cameras on the maps. The graphical symbols may also indicate the directions in which each of the cameras is pointed as well as the potential range of directions in which each camera may be pointed. VMS application 344 displays one or more of these maps and the associated information on display 346 of computer 340.

Based on the information displayed, a user of computer 340 is able to select one of the cameras using a graphical understanding of which store the camera is located in, which department the camera covers, and specifically which area of the department is covered by the camera. In this example, the user selects camera 304 using a user interface or some other type of input device associated with computer 340. The camera is selected by moving a cursor, pointer, or other graphical indicator over the graphical symbol which represents the location of the camera 304.

VMS application 344 receives information about camera 304 and displays that information to the user. The received information may include information identifying camera 304, describing the scene or department covered by camera 304, a background image of the scene covered by camera 304, or other information. A background image may be useful if the user wants to gain an understanding of the scene covered by the selected camera but does not necessarily want or need to see live video from the camera. In this case, VMS application 344 may be able to retrieve a background image for camera 304 from storage system 324 or storage system 354 without requesting video from VCS 320.

In a variation of the example above, the user may indicate a desire to view video from camera 304 based on the previously displayed information about the camera. In this case, VCS 320 provides video received from camera 304 over communication network 318 to VMS application 344. VMS application 344 may display the video on display 346 in full screen format or may display the video in a thumbnail view superimposed over the map which shows the location of the video source.

VMS application 344 may also allow the user to select a second camera, camera 305 for example, and view video from both camera 304 and camera 305 on display 346 superimposed on the map. In this way, the user may be able to simultaneously view a person, object or incident from multiple angles. This configuration may also enable the user to easily track a person or object as it moves from one scene to another. The graphical layout of the map and the indicated locations and directions of the cameras allow a remote user to gain a better spatial understanding of the site and use that spatial understanding to better understand the context of the activities taking place in the displayed video.

One skilled in the art will appreciate that the functions associated with VMS applications 334 and 344 and VCS 320 may be combined into a single device or distributed across VCS 320 and the VMS applications, or other devices, in a variety of manners.

Figure 4:
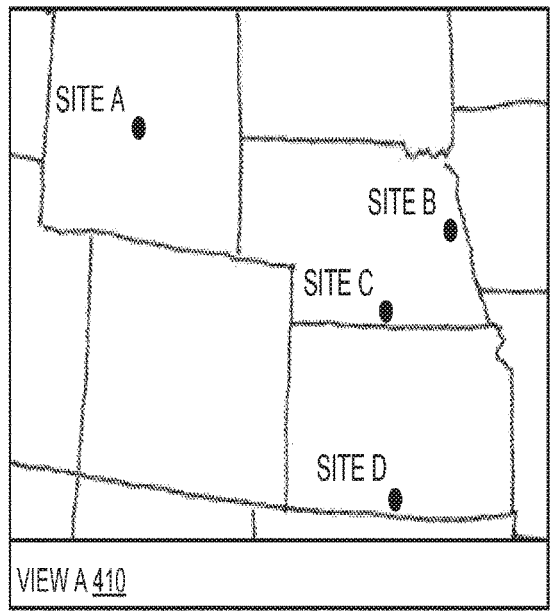
FIG. 4 illustrates four example display views of a video management system.
Figure 4:
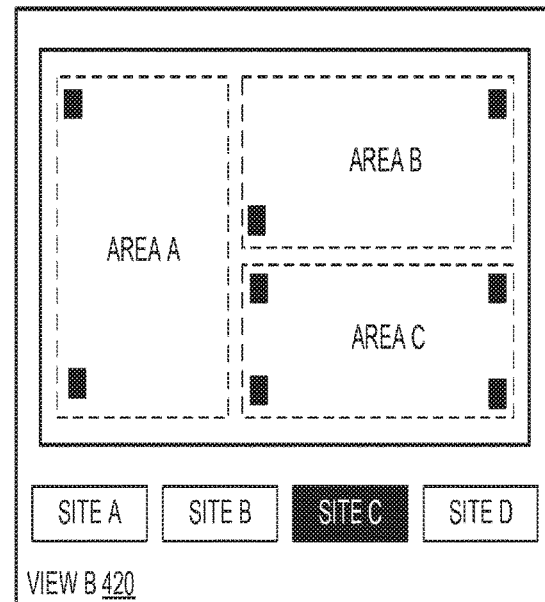
Figure 4:
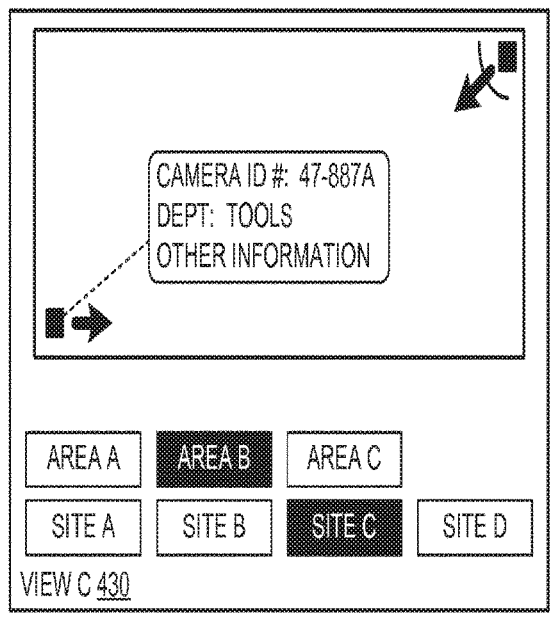
Figure 4:
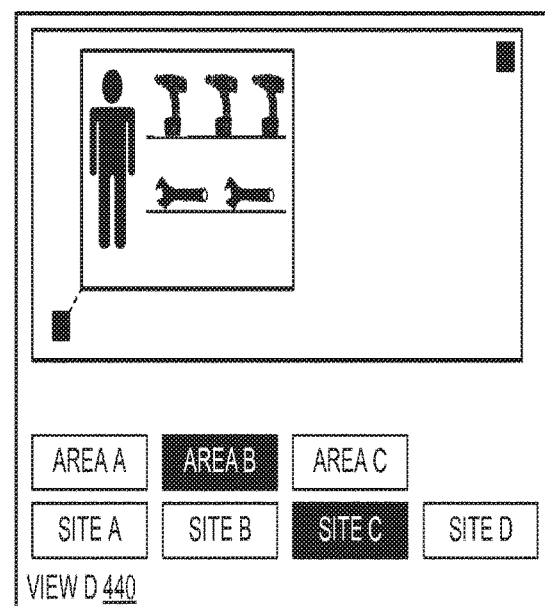

FIG. 4 illustrates four example display views generated by VMS application 334 of video system 300 and displayed on display 336 of computer 330. In this example, two additional sites are included, site C and site D. Sites C and D are similar to sites A and B of FIG. 3 in that they include video cameras which are linked to video system 300. The four sites may be in different geographical regions, may be different areas within a single building, or may be any combination of physical locations.

In this example, view A 410 is displayed on display 336 of computer 330 when VMS application 334 is executed. View A 410 provides the user a graphical and spatial representation of where the sites containing cameras are located with respect to each other. The graphical icon or symbol on display 336 associated with each site may be accompanied by other information about the location of the site including city name, state name, address, building number, site description, or other identifying information. In one variation of this example, sites at which cameras are not currently operational, active, or otherwise available may be grayed-out or otherwise visually distinguished from those sites which have operational cameras.

In this example, the user selects site C. VMS application 334 then generates and displays view B 420. The list of available sites is displayed at the bottom of the view along with an indication that information from site C is being viewed. This allows the user to view the map for site C as well as easily switch to a map for another site if desired. Based on configuration information received for site C, a map is generated showing the different areas and camera locations for the store at site C. In this case, the store has three areas of coverage: area A, area B, and area C. The area names may also include descriptive information such as "apparel," "tools," "cash registers," or other types of descriptive information. The map also indicates the number and approximate location of cameras through use of graphical symbols, small black boxes in this case.

The user then selects one of the areas displayed in view B 420 in order to see more detailed information about the area and video coverage of the area. In this example, the user selects area B and VMS application generates view C 430 which shows a more detailed map of area B on display 336 of computer 330 based on the previously received configuration data. The physical location of each camera in area B is indicated on the map using a graphical symbol. The graphical symbols include directional arrows which indicate the direction in which each camera is pointed. In the case of the camera in the upper right, an arc also indicates the available range of positioning or range of motion of the camera. Buttons at the bottom of view C 430 allow the user to easily switch to other sites or other areas with a single selection.

The map of area B in view C 430 may also include further details about the store including the location of shelves, aisles, display cases, doors, cash registers, or other items. The map may also designate the location of departments or categories of products within the map of area B or any other information which aids in understanding the floorplan of that area of the store. The map and the additional information on the map give the user a spatial and physical understanding of the area covered by the camera. Based on this information, the user may be able to ascertain the types of objects or activities which may be captured by the camera without actually having to access, request, or retrieve images or video from the camera.

The maps in view A 410, view B 420, and view C 430 have a hierarchical relationship. The map in view C 430 is a more detailed view of one area of the map in view B 420 and the map in view B 420 is a more detailed view of one area of the map in view A 410. Additional tiers and branches of the hierarchy of maps are possible.

Within view C 430, the user may get additional information about the cameras. For example, if the user hovers a cursor over, or otherwise selects, the graphical symbol in the lower left corner of area B in view C 430, additional information about the associated camera is displayed. This can be accomplished through use of an extensible markup language (XML) file which relates the position of the cursor to locations on the map or through other means. This additional information may include: an identification number of the camera, a name of the camera, a name of the department covered by the camera, a description of the products covered by the camera, a description of the area covered by the camera, or other information. The user is able to view this information without actually having to access, request, or receive video from the camera. This information may be stored in and received from multiple locations within video system 300.

Continuing with FIG. 4, the user may view video from a camera by selecting the camera. The request is transmitted to VCS 320. VCS 320 either transmits a live video stream from the selected camera or retrieves the video associated with that camera from storage system 324. In either case, video is transmitted to VMS application 334 through communication network 328. VMS application 334 displays the video as illustrated in view D 440. The video is displayed in a small window, or thumbnail, which is overlaid on the map of area B. In this way, the user can view the video and still see the map which indicates the spatial relationship of the video to the area. In one variation of this example, the user may expand the video to full screen mode such that the video being viewed occupies the entire area of display 336.

The user may also use VMS application 334 to view video from two cameras simultaneously. In this case, a small window or thumbnail associated with each camera is overlaid on the map of the area. In this way, the user may view the same person or activity from multiple angles if the particular location is covered by two or more cameras. Also, the user may also use the two videos to more easily monitor movement of a person or an object from one area of the store to another.

In a variation of the examples discussed above, VMS application 334 contains information used to determine which camera, if any, covers any location on the map selected by the user. When a user selects a location, VMS application 334 determines which camera best covers that area and displays video from that camera. In the case where there are multiple cameras which cover that location, VMS application 334 may offer the user a choice of those cameras or may display background images or video from all of the applicable cameras in a mosaic style display.

In addition to the functions described above, any of the VMS or VMS applications discussed above may perform additional video processing functions. The additional video processing functions may include algorithms for video analytics, motion detection, object identification, motion analysis, compression, thinning, or other functions.

In addition to security and loss prevention uses, the systems and methods discussed above may also be used for other purposes. The systems and methods may be used for marketing or business purposes including analyzing traffic patterns, determining shopper preferences, assessing customer behavior, determining stocking levels, modeling buying patterns, or for other purposes.

Figure 5:
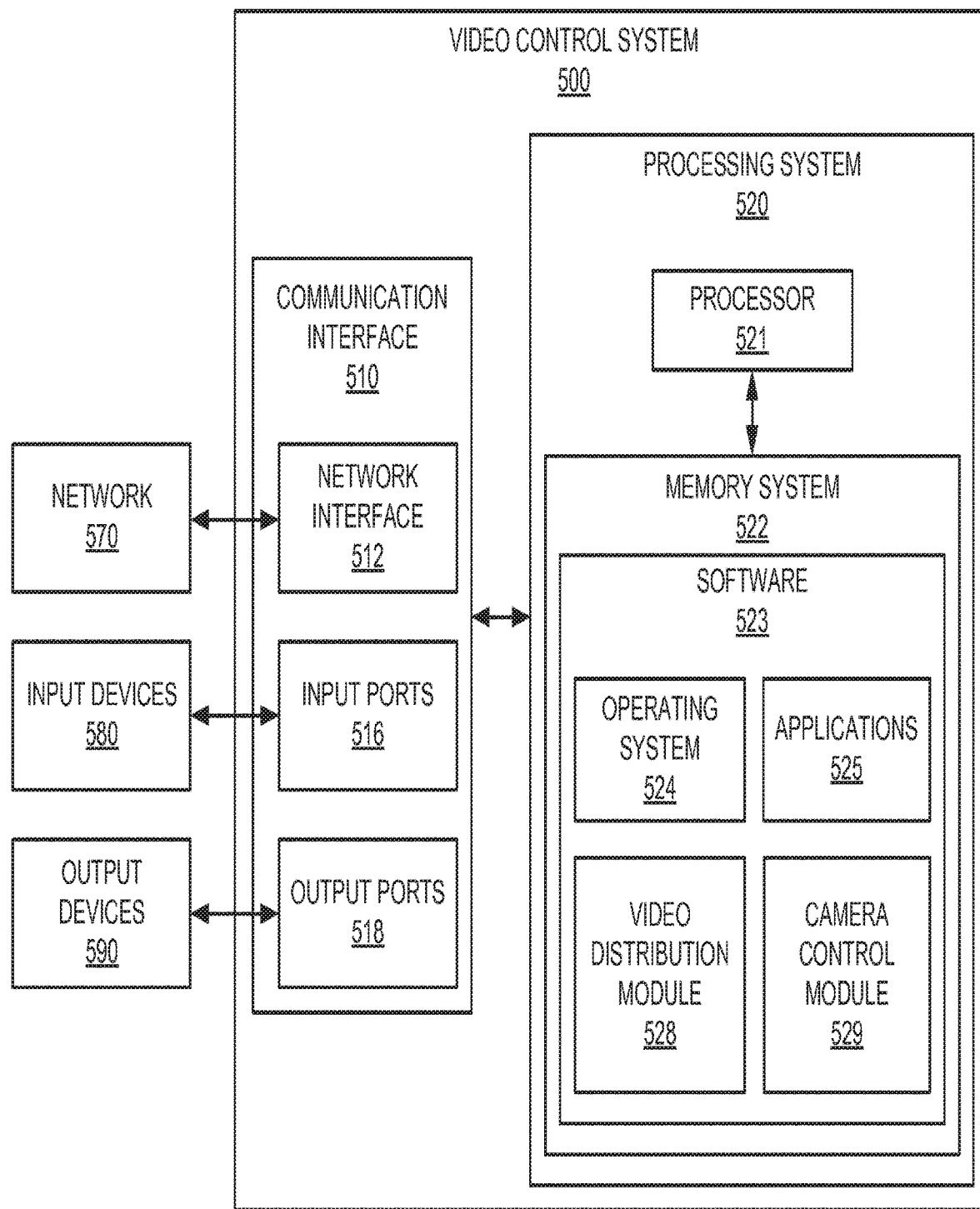
FIG. 5 illustrates a video control system.

FIG. 5 illustrates VCS 500. VCS 500 includes communication interface 510 and processing system 520. Processing system 520 is linked to communication interface 510 through a communication link.

Communication interface 510 includes network interface 512, input ports 516, and output ports 518. Communication interface 510 includes components that communicate over communication links, such as network cards, ports, RF transceivers, processing circuitry and software, or some other communication device. Communication interface 510 may be configured to communicate over metallic, wireless, or optical links. Communication interface 510 may be configured to use TDM, IP, Ethernet, optical networking, wireless protocols, communication signaling, or some other communication format, including combinations thereof.

Network interface 512 is configured to connect to external devices over network 570. Network 570 is an example of communication network 318 although network 570 may have an alternate configuration or operate in an alternate manner. Input ports 516 are configured to connect to input devices 580 such as a video source, a camera, a storage system, or other input device. Output ports 518 are configured to connect to output devices 590 such as a storage system, a communication link, a display, or other output devices.

Processing system 520 includes processor 521 and memory system 522. Processor 521 includes microprocessor and other circuitry that retrieves and executes operating software from memory system 522. Memory system 522 comprises software 523. Memory system 522 may be implemented using random access memory, read-only memory, a hard drive, a tape drive, flash memory, optical storage, or other memory apparatus.

Software 523 comprises operating system 524, applications 525, video distribution module 528, and camera control module 529. Software 523 may also comprise additional computer programs, firmware, or some other form of non-transitory, machine-readable processing instructions. When executed by processor 521, operating system 524 directs processing system 520 to operate VCS 500 as described herein using applications 525, video distribution module 528, and camera control module 529. Video distribution module 528 directs processing system 520 to receive video from various cameras and transmit the requested video to video management systems. Camera control module 529 directs processing system 520 to send control instructions to cameras instructing them to pan, tilt, zoom, power cycle, or perform other functions.

It should be understood that the functions and features of VCS 500 illustrated in FIG. 5 may be implemented in or performed by other devices including other devices within video system 100 or video system 300.

Figure 6:
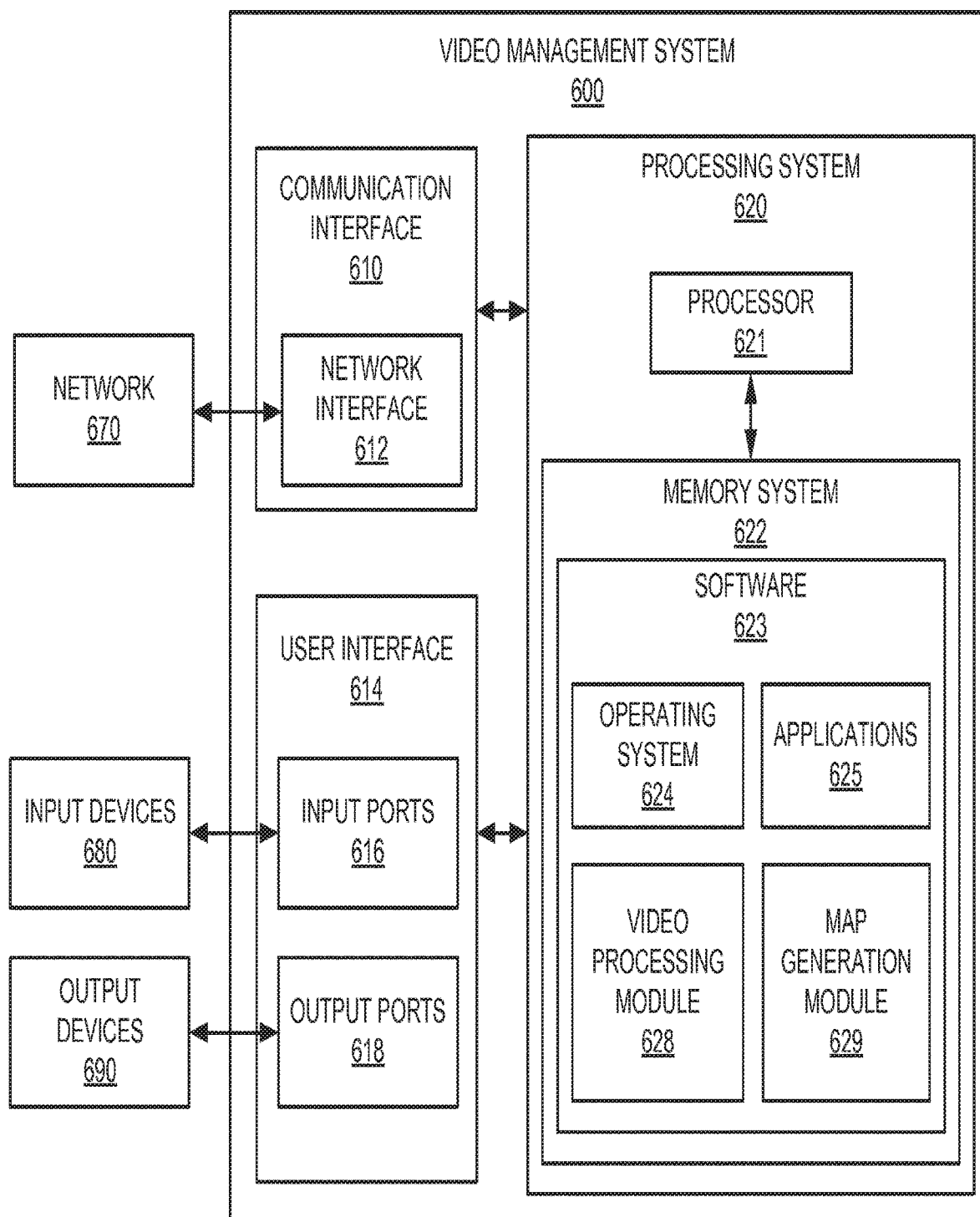
FIG. 6 illustrates a video management system.

FIG. 6 illustrates VMS 600. VMS 600 includes communication interface 610, user interface 614, and processing system 620. Processing system 620 is linked to communication interface 610 and user interface 614 through communication links.

Communication interface 610 includes network interface 612. Communication interface 610 includes components that communicate over communication links, such as network cards, ports, RF transceivers, processing circuitry and software, or some other communication device. Communication interface 610 may be configured to communicate over metallic, wireless, or optical links. Communication interface 610 may be configured to use TDM, IP, Ethernet, optical networking, wireless protocols, communication signaling, or some other communication format, including combinations thereof. Network interface 612 is configured to connect to external devices over network 670. Network 670 is an example of communication network 328 although network 670 may have an alternate configuration or operate in an alternate manner.

User interface 614 includes input ports 616 and output ports 618. Input ports 616 are configured to connect to input devices 680 such as a keyboard, a mouse, a touchscreen, a storage system, or other input devices. Output ports 618 are configured to connect to output devices 690 such as a display, a storage system, a printer, or other output devices.

Processing system 620 includes processor 621 and memory system 622. Processor 621 includes microprocessor and other circuitry that retrieves and executes operating software from memory system 622. Memory system 622 comprises software 623. Memory system 622 may be implemented using random access memory, read-only memory, a hard drive, a tape drive, flash memory, optical storage, or other memory apparatus.

Software 623 comprises operating system 624, applications 625, video processing module 628, and map generation module 629. Software 623 may also comprise additional computer programs, firmware, or some other form of non-transitory, machine-readable processing instructions. When executed by processor 621, operating system 624 directs processing system 620 to operate VMS 600 as described herein using applications 625, video processing module 628, and map generation module 629. Video processing module 628 directs processing system 620 to display video associated with the selected video source. Map generation module 629 directs processing system 620 to generate maps, display maps, display the location of cameras on the maps, and display other information.

It should be understood that the functions and features of VMS 600 illustrated in FIG. 6 may be implemented in or performed by other devices including other devices within video system 100 or video system 300.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. In a computer system having a graphical user interface including a display and a selection device, a method of providing and selecting from the graphical user interface to operate a video system for video surveillance, the method comprising:

initializing the graphical user interface, the graphical user interface displaying a plurality of views, wherein each of the plurality of views includes:
a map based on received configuration data, wherein each map in the plurality of views has a hierarchical relationship such that one map in the hierarchy provides a more detailed view of one section of another map in the hierarchy,
a plurality of links graphically depicted in each map, wherein each link of the plurality of links in each map represents a section of the map and connects to another one of the maps having the more detailed view of the section associated with the link, and
a list of other links graphically depicted in the plurality of views, wherein the other links represent the links graphically depicted in one of the plurality of views, wherein the list of other links are graphically depicted as selectable buttons;

displaying on the graphical user interface the least detailed map view, wherein the plurality of links in the least detailed map view each represent a site on the map;

selecting one of the site links depicted as a selectable graphical icon in the least detailed map view on the graphical user interface, wherein the selection is made by clicking on the selectable graphical icon associated with the site link;

displaying on the graphical user interface a site map view associated with the selected site link, wherein the plurality of links in the site map view each represent an area of the map, further wherein the list of links in the site map view represent a site from the least detailed map view;

selecting one of the area links depicted as a selectable symbol in the site map view on the graphical user interface, wherein the selection is made by clicking on the selectable symbol associated with the area link;

displaying on the graphical user interface an area map view associated with the selected area link, wherein the plurality of links in the area map view each represent the location of a video source in the area, further wherein the list of links in the area map view represent an area from the site map view;

selecting a location anywhere in the map of the area apart from the plurality of video source links; and simultaneously displaying a selected plurality of video streams on the graphical user interface associated with the selected location, wherein the selected plurality of video streams associated with the selected location are the plurality of video source links that cover the selected location, wherein the selected plurality of video streams depict the selected location from various angles.

2. The method of claim 1, wherein the graphical depiction of the site links in least detailed view provide a graphical and spatial representation of a location of each site with respect to each other site.

3. The method of claim 2, wherein the sites may be in different geographical regions.

4. The method of claim 1, wherein the graphical depiction of the area links in the site map view provide a graphical and spatial representation of a location of each area with respect to each other area of the selected site.

5. The method of claim 1, wherein the video sources for the displayed video streams may be in different geographic locations.

6. The method of claim 1, wherein the site map view includes the names of each area and a description of each area.

7. The method of claim 1, wherein the site map view includes a graphical depiction of video sources within each of the plurality of areas depicting the physical location of each video source on the map.

8. In a computer system having a graphical user interface including a display and a selection device, a method of providing and selecting from the graphical user interface to operate a video system for video surveillance, the method comprising:
   initializing the graphical user interface, the graphical user interface displaying a plurality of views, wherein each of the plurality of views includes:
      a map based on received configuration data, wherein each map in the plurality of views has a hierarchical relationship such that one map in the hierarchy provides a more detailed view of one section of another map in the hierarchy,
      a plurality of links graphically depicted in each map, wherein each link of the plurality of links in each map represents a section of the map and connects to another one of the maps having the more detailed view of the section associated with the link, and
      a list of other links graphically depicted in the plurality of views, wherein the other links represent the links graphically depicted in one of the plurality of views, wherein the list of other links are graphically depicted as selectable buttons;
   displaying on the graphical user interface the least detailed map view, wherein the plurality of links in the least detailed map view each represent a site on the map;
   selecting one of the site links depicted as a selectable graphical icon in the least detailed map view on the graphical user interface, wherein the selection is made by clicking on the selectable graphical icon associated with the site link;
   displaying on the graphical user interface a site map view associated with the selected site link, wherein the plurality of links in the site map view each represent an area of the map, further wherein the list of links in the site map view represent a site from the least detailed map view;
   selecting one of the area links depicted as a selectable symbol in the site map view on the graphical user interface, wherein the selection is made by clicking on the selectable symbol associated with the area link;
   displaying on the graphical user interface an area map view associated with the selected area link, wherein the plurality of links in the area map view each represent the location of a video source in the area, further wherein the list of links in the area map view represent an area from the site map view;
   selecting one of the plurality of video source links in the area map view; and
   simultaneously displaying a plurality of video streams on the graphical user interface, where in the plurality of videos streams includes the video steam associated with the selected video source link and all additional video streams that cover the location covered by of the selected video source link, wherein the plurality of video streams depict a scene of the location covered by the selected video source link from various angles.

9. The method of claim 8, wherein the graphical depiction of the site links in least detailed view provide a graphical and spatial representation of a location of each site with respect to each other site.

10. The method of claim 9, wherein the sites may be in different geographical regions.

11. The method of claim 8, wherein the graphical depiction of the area links in the site map view provide a graphical and spatial representation of a location of each area with respect to each other area of the selected site.

12. The method of claim 8, wherein the video sources for the displayed video streams may be in different geographic locations.

13. The method of claim 8, wherein the site map view includes the names of each area and a description of each area.

14. The method of claim 8, wherein the site map view includes a graphical depiction of video sources within each of the plurality of areas depicting the physical location of each video source on the map.

15. A graphical user interface for operating a video system for video surveillance, the graphical user interface comprising:
   a plurality of maps based on received configuration data, wherein each map in the plurality of maps has a hierarchical relationship with each other such that one map in the hierarchy provides a more detailed view of one section of another map in the hierarchy;
   a plurality of selectable links graphically depicted in each map, wherein each link of the plurality of links in each map represents a section of the map and connects to another one of the maps having the more detailed view of the section associated with the link, wherein selecting a graphically depicted link will cause the map associated with the selected graphically depicted link to be displayed, and
   a plurality of selectable buttons, wherein each selectable button represents the sections of the map graphically depicted in one of the plurality of views, wherein selecting one of the selectable buttons will cause the map associated with the selected selectable button to be displayed;
   wherein the graphical user interface is initialized to display the least detailed map, wherein the least detailed map displays sections with selectable links, each section of the least detailed map representing a site on the map;
   wherein selecting one of the site links depicted as a selectable graphical icon in the least detailed map on the graphical user interface causes the graphical user interface to display a site map associated with the selected site link, wherein the selection is made by clicking on the selectable graphical icon associated with the site link, further wherein the site map displays sections with selectable links, each section of the site map representing an area of the section on the map, further wherein the site map displays selectable buttons, wherein each selectable button displayed on the site map represents a site displayed on the least detailed map;
   wherein selecting one of the area links depicted as a selectable symbol in the site map on the graphical user interface causes the graphical user interface to display an area map associated with the selected area link, wherein the selection is made by clicking on the selectable symbol associated with the area link further wherein the area map displays sections with selectable links, each section of the area map representing a video source in the area on the map, further wherein the area map displays selectable buttons, wherein each selectable button displayed on the site map represents an area displayed on the site map;
   wherein selecting one of the selectable site buttons in the site map causes the graphical user interface to display the site map associated with the selected site button;

wherein selecting a location anywhere in the map of the area apart from the plurality of video source links causes the graphical user interface to display simultaneously a plurality of video streams on the graphical user interface associated with the selected location, wherein the plurality of video streams associated with the selected location are the plurality of video source links that cover the selected location, wherein the selected plurality of video streams depict the selected location from various angles;

wherein selecting a video source link causes the graphical user interface to display the video stream associated with the selected video source link; and wherein selecting one of the selectable area buttons in the area map causes the graphical user interface to display the area map associated with the selected area button.

16. The graphical user interface of claim 15, wherein the sites displayed in the least detailed map provide a graphical and spatial representation of a location of each site with respect to each other site, further wherein the sites may be in different geographical regions.

17. The graphical user interface of claim 15, wherein the areas displayed in each site map provide a graphical and spatial representation of a location of each area with respect to each other area of the selected site.

18. The graphical user interface of claim 15, wherein the video sources associated with each video stream displayed in each area map may be in different geographic locations.

19. The graphical user interface of claim 15, wherein the site map displays the names of each area and a description of each area.

20. The graphical user interface of claim 15, wherein the site map displays a graphical depiction of each video source within each of the plurality of areas depicting the physical location of each video source on the site map.

* * * * *